United States Patent
Shan et al.

(10) Patent No.: US 9,019,650 B1
(45) Date of Patent: Apr. 28, 2015

(54) MULTI-STAGE ACTUATOR WITH WRITER POSITION DETERMINATION CAPABILITY

(71) Applicant: Seagate Technology LLC, Cupertino, CA (US)

(72) Inventors: Ximin Shan, Longmont, CO (US); Jye Kai Chang, Longmont, CO (US); Sandeep Sequeira, Johnstown, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/265,576

(22) Filed: Apr. 30, 2014

(51) Int. Cl.
*G11B 21/02* (2006.01)
*G11B 5/48* (2006.01)

(52) U.S. Cl.
CPC .................................... *G11B 5/48* (2013.01)

(58) Field of Classification Search
None
See application file for complete search history.

(56) References Cited

U.S. PATENT DOCUMENTS

| | | | |
|---|---|---|---|
| 6,538,839 B1 | 3/2003 | Ryan | |
| 6,660,622 B2 | 12/2003 | Chen et al. | |
| 6,717,757 B1 | 4/2004 | Levy et al. | |
| 6,882,489 B1 | 4/2005 | Brunnett et al. | |
| 6,940,679 B1 | 9/2005 | McNeil et al. | |
| 7,002,766 B2 | 2/2006 | Kisaka et al. | |
| 7,072,134 B1 * | 7/2006 | Hirano et al. | 360/55 |
| 7,079,338 B1 * | 7/2006 | Semba et al. | 360/31 |
| 7,088,535 B2 | 8/2006 | Kim et al. | |
| 7,106,552 B2 | 9/2006 | Hirano et al. | |
| 7,558,016 B1 | 7/2009 | Le et al. | |
| 7,602,577 B1 | 10/2009 | Kose et al. | |
| 8,300,348 B1 | 10/2012 | Liu et al. | |
| 8,467,144 B2 | 6/2013 | Lim et al. | |
| 8,605,384 B1 | 12/2013 | Liu et al. | |
| 8,611,040 B1 | 12/2013 | Xi et al. | |
| 2007/0211372 A1 | 9/2007 | Takaishi | |
| 2013/0114162 A1 | 5/2013 | Zhang et al. | |

* cited by examiner

*Primary Examiner* — K. Wong
(74) *Attorney, Agent, or Firm* — Hall Estill Attorneys at Law

(57) ABSTRACT

Apparatus and method for determining a position of a writer supported by a multi-stage actuator. In some embodiments, the apparatus includes a multi-stage actuator which supports a transducer adjacent a data recording surface. The multi-stage actuator has a coarse actuator and a microactuator. The transducer includes a write element and a read element. A controller is adapted to determine a position of a write element of the transducer with respect to the data recording surface responsive to a position of a read element of the transducer and a displacement distance of the microactuator away from a neutral position.

20 Claims, 6 Drawing Sheets

MULTI-STAGE ACTUATOR WITH WRITER POSITION DETERMINATION CAPABILITY

SUMMARY

Various embodiments of the present disclosure are generally directed to a multi-stage actuation system that determines an estimated position of a writer, such as for use in a data storage device.

In some embodiments, an apparatus includes a multi-stage actuator which supports a transducer adjacent a data recording surface. The multi-stage actuator has a coarse actuator and a microactuator. The transducer includes a write element and a read element. A controller is adapted to determine a position of a write element of the transducer with respect to the data recording surface responsive to a position of a read element of the transducer and a displacement distance of the microactuator away from a neutral position.

In other embodiments, an apparatus includes a data recording medium on which a plurality of adjacent tracks is defined. A multi-stage actuator supports a transducer adjacent the data recording medium. The multi-stage actuator has a voice coil motor (VCM) to advance the transducer along a first stroke path across the medium, and a microactuator to advance the transducer along a second stroke path across the medium. A controller determines a position of the write element of the transducer with respect to a selected track on the medium during a write operation thereto responsive to a position of the read element and responsive to a displacement distance of the microactuator away from a neutral position along the second stroke path.

In further embodiments, a method includes steps of determining a position of a write element with respect to a recording surface in response to a position of a read element and a displacement of a microactuator away from a neutral position. A write operation is interrupted in response to the determined position of the write element and a write fault threshold distance.

These and other features and aspects which characterize various embodiments of the present disclosure can be understood in view of the following detailed discussion and the accompanying drawings.

DETAILED DESCRIPTION

Figure 1:
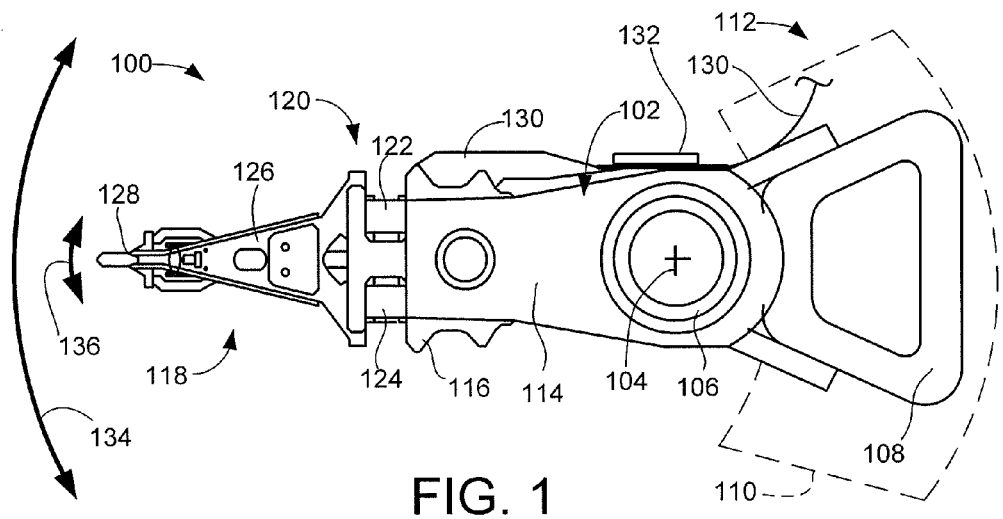
FIG. 1 depicts a multi-stage actuator constructed and operated in accordance with various embodiments of the present disclosure.

The present disclosure is generally directed to a multi-stage actuator adapted to move a control object from an initial position to a destination position using parallel control paths.

Multi-stage actuators can be used in a wide variety of operational environments, including but not limited to data storage devices. In the field of data storage, multi-stage actuators can be used to position read and write elements (readers and writers) relative to a rotatable data recording medium. Dual stage actuators provide a first (coarse) stage of control through a primary actuation mechanism, such as a voice coil motor (VCM), and a second (fine) stage of control through a secondary actuator mechanism, such as a collocated microactuator (uA).

A dual stage actuator may be of the in-line swing-arm (rotary) type with a main body that is pivotable about a pivot point adjacent an outermost diameter of a recording media stack. A voice coil extends from a first end of the main body opposite the media and is immersed in a magnetic circuit to provide a first stage stroke path. One or more rigid actuator arms extend from an opposing second end of the main body and project adjacent the respective media surfaces. One or more head-gimbal assemblies (HGAs) are supported by each actuator arm, with each HGA generally comprising a flexure, a gimbaled transducer and a microactuator.

The transducer can comprise a hydrodynamically supported slider to which are attached the read and write elements, as well as other optional elements such as a HAMR (heat assisted magnetic recording) module, a heater for fly height adjustment, etc. The transducer, and by extension, the read/write elements, are rotated or otherwise controllably displaced using the microactuator along a smaller, second stage stroke path. The first stage stroke path carries the transducer substantially across the entirety of the media surface. The second stage stroke path carries the transducer across a much smaller localized area of the media surface, such as over a relatively small number of adjacent data tracks (e.g., 5-10, depending on track density and microactuator configuration).

Position information can be generated in the form of a position error signal (PES) from embedded servo information (servo bursts) written to the media surfaces. An observer/estimator module can provide position estimates for control actions at samples k between servo bursts. The ratio of samples to servo bursts can vary but may be on the order of around 5:1 or greater.

While dual stage actuators can provide greater positional control and resolution as compared to single-stage actuators (e.g., actuators that only use the VCM for positional control), a problem can sometimes arise when performing write operations using the writer. The PES as usually formulated provides an estimate of the radial position of the reader. In a single-stage actuator, the corresponding location of the writer can be estimated in relation to the position of the reader, the distance between the reader and the writer, and the then-existing skew angle (if any) based on radial location of the transducer.

A dual stage actuator introduces additional offset of the writer if the microactuator has moved the transducer away from its steady-state ("neutral") position along the microactuator stroke path. This can provide uncertainty as to the actual position of the writer, which in extreme cases may result in encroachment as the writer writes data to a location that inadvertently partially (or fully) overwrites an existing track.

One solution is to maintain the microacuator substantially in the neutral position during write operations, but this essentially eliminates the additional control resolution provided by the second stage microactuator. Moreover, in some cases such as the presence of vibration, it may be desirable to actuate the microactuator away from the neutral position to compensate for vibratory displacements encountered by the transducer. Faster sequential writes to immediately adjacent tracks may be achievable in some cases by using the microactuator to apply stepwise positional adjustments away from the neutral position, and such advantages are lost if the writer is required to remain in the neutral position during write operations.

Accordingly, various embodiments of the present disclosure are generally directed to accurately estimating the position of a writer in a two-stage actuator system. Generally, as explained below a modified PES is generated that indicates the writer position based on microactuator displacement, and a write interrupt (e.g., write unsafe trigger signal) is generated if the writer position exceeds a predetermined threshold.

The writer position can be generated using two main components: a closed loop microactuator position observer/estimator that uses a state space observer design, and a formulation module that converts microactuator (uA) motion to read/write offset perturbation. The writer position can be compared to a position threshold, and a write fault interrupt can be declared if the writer position exceeds the position threshold. In this way, the likelihood of inadvertently overwriting existing data on the medium is reduced.

These and other features of the various embodiments disclosed herein can be understood beginning with a review of FIG. 1 which shows a top plan view of a multi-stage actuator 100 that is constructed and operated in a data storage environment in accordance with various embodiments of the present disclosure. It will be appreciated that a data storage environment is merely illustrative and is not necessarily limiting to the scope of the claimed subject matter.

The actuator 100 includes a main body 102 that is configured for rotation about a pivot point 104 via a cartridge bearing assembly 106. A voice coil 108 extends from the main body 102 and is immersed in a magnetic field from a magnet 110 of a voice coil motor (VCM) 112. A rigid actuator arm 114 extends from the main body 102 and is attached to an attachment plate 116 of a head/suspension assembly (HSA) 118.

The HSA 118 includes a microactuator (uA) 120 which, in FIG. 1, takes a collocated microactuator configuration. The collocated microactuator 120 has spaced apart first and second piezoelectric transducing (PZT) elements 122, 124 that mechanically interconnect the attachment plate 116 to a head gimbal assembly (HGA) 126. The HGA 126 includes a data transducer 128 adapted to write data to and read data from an adjacent data recording surface. It will be apparent that non-collocated microactuator configurations can be used, including but not limited to configurations that use a single microactuating (e.g., PZT, etc.) element.

A flex cable 130 provides electrical interconnection paths from the VCM 112, the microactuator 120 and the transducer 128 to a preamp and control assembly 132 mounted to the side of the main body 102 of the actuator 100. While it is contemplated that control functions described herein may be located in other portions of a data storage device in which the actuator 100 is enclosed, it is contemplated that aspects of such control functions may be incorporated into the control assembly 132.

The actuator 100 is characterized as a dual stage (two stage) actuator. Additional actuation stages can be incorporated into the actuator. A first (coarse) stage of actuation is provided by the VCM 112 to cause the transducer 128 to generally move along a first (VCM) stroke path, generally represented at 134. A second (fine) stage of actuation is provided by the microactuator 120 to cause the transducer 128 to generally move along a smaller, second (uA) stroke path, generally represented at 136. The VCM stroke path 134 is contemplated as extending substantially across the entire radial extent of an adjacent data recording surface. The microactuator stroke path 136 is substantially smaller than the VCM stroke path 134 and extends across a relatively small localized area on the recording surface. In some cases, the microactuator stroke path 136 may span several adjacent tracks.

Figure 2:
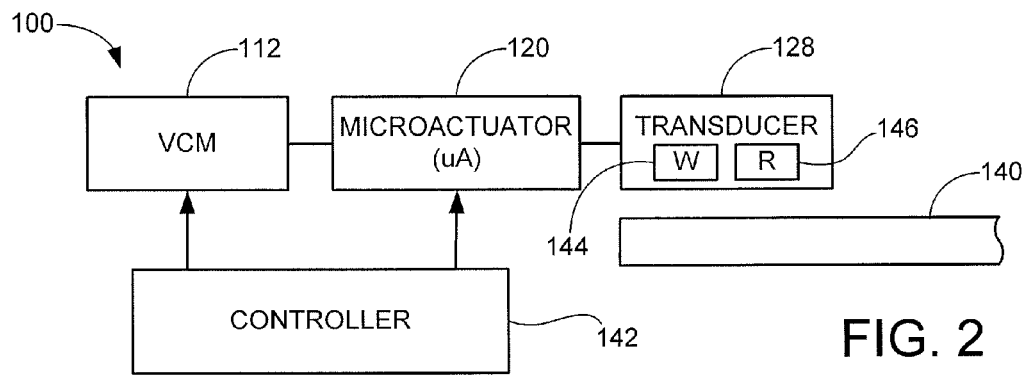
FIG. 2 is a functional block representation of the actuator of FIG. 1 in conjunction with an adjacent data recording medium.

FIG. 2 is a functional block representation of the actuator 100 of FIG. 1 in conjunction with an adjacent data recording medium 140. The VCM 112 and microactuator 120 from FIG. 1 are represented by respective blocks that operate under the direction of a controller 142. The transducer 128 from FIG. 1 includes a slider (not separately shown) adapted to be supported adjacent the medium 140 by fluidic currents established by high speed rotation of the medium. The transducer 128 further includes a writer section 144 and a reader section 146, both of which are attached to or incorporated into the slider.

The writer section 144 has one or more write elements ("writers") adapted to magnetically write (program) data to tracks defined on the medium 140. The reader section 146 has one or more read elements ("readers" or "read sensors") adapted to magnetically transduce read signals from the written tracks to recover previously stored data. The transducer 128 may incorporate other active elements that are not separately shown in FIG. 2 including one or more heaters or other fly height adjustment (FHA) mechanisms, and a heat assisted magnetic recording (HAMR) module to provide thermally assisted writing operations.

Figures 3A, 3B:
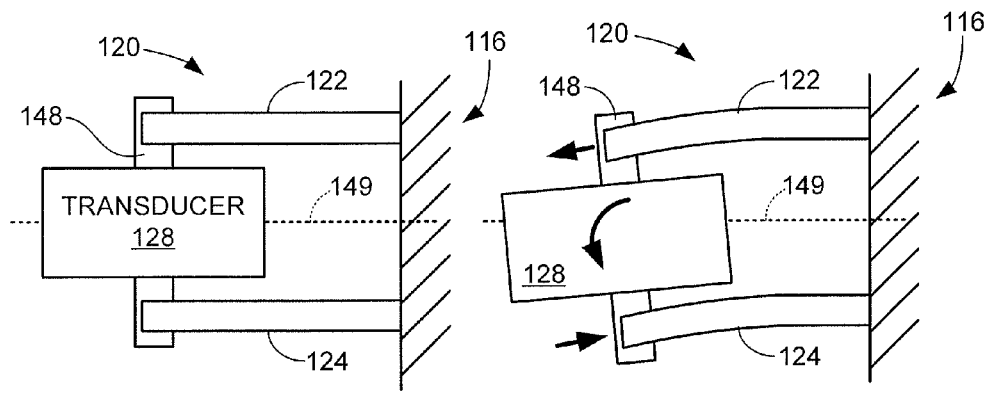
FIGS. 3A and 3B schematically depict operation of a microactuator portion of the actuator of FIGS. 1-2.

FIGS. 3A and 3B depict the microactuator 120 in accordance with some embodiments. The spaced apart PZT elements 122, 124 from FIG. 1 are respectively connected between the rigid base plate 116 and a rigid cross-member 148. Controlled application of voltages to the PZT elements 122, 124 induces rotational displacement of the transducer 128 relative to the base plate 116.

FIG. 3A depicts a neutral position of the transducer 128. In the neutral position, the transducer is nominally aligned with a centerline 149 (or other reference point) of the actuator arm 114. The centerline 149 intersects the actuator pivot 104 (see FIG. 1). The neutral position can be nominally achieved by not applying any activation voltage to the PZT elements 122, 124. In this position, the actuator 100 can be operated as a single stage actuator.

FIG. 3B depicts application of a first voltage which lengthens PZT element 122 and a second voltage that shortens PZT element 124. The voltages induce rotational deflection of the transducer 128. Similar deflection can be made in the opposing direction by reversing the polarities of the applied voltages.

In some embodiments, the PZT elements 122, 124 are connected such that a positive voltage is applied to one element and a corresponding negative voltage of nominally the same magnitude is applied to the other element, and vice versa. This allows a single PZT voltage value to be applied to both elements, with the polarity of the PZT voltage determining deflection direction (e.g. left or right) and the magnitude of the PZT voltage determining the amount of deflection. Such is merely exemplary and is not required.

Figure 4:
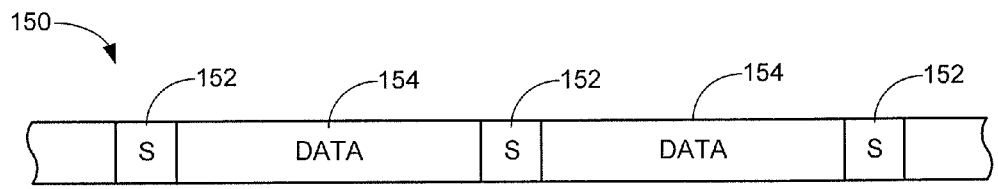
FIG. 4 shows an example format for a track on the data recording medium of FIG. 2.

FIG. 4 shows a portion of a data track 150 defined on the rotatable data recording medium 140 of FIG. 2. The data track 150 includes spaced apart servo (S) fields 152 interspersed among data regions 154. The servo fields 152 are angularly arranged about the circumference of the medium 140 like spokes of a wheel so as to extend from an innermost diameter (ID) to an outermost diameter (OD) of the medium. The format of the servo fields can vary, but an exemplary format can include a synchronization (sync) field, an automatic gain control (AGC) field, an index (angular reference) field, a track address (radial reference) field and a sequence of dibit (ABCD) patterns for intra-track positioning control.

Data blocks (e.g., sectors) of generally fixed length can be defined in the data regions 154 between adjacent pairs of the servo fields 152. The writer and reader sections 144, 146 (see FIG. 2) can be used to write user data to, and read data from, the data sectors. In addition, the reader section 146 can be used to periodically detect the servo data in the servo fields 152 to provide servo control positioning information during both write and read operations.

The controller 142 (FIG. 2) uses an estimator/observer design to provide estimates of servo control position as the transducer is located over the data regions 154. Actual servo samples may be generated to indicate the position of the transducer as each servo field 152 is encountered. An additional number of estimated servo samples are generated over the data regions 154 between the actual servo samples. In this way, positional control inputs can be generated and applied to the VCM and/or microactuator (uA) while the transducer is located over the data regions.

Figure 5A:
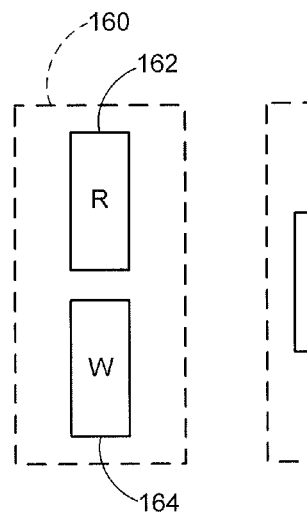
FIGS. 5A-5C illustrate different exemplary configurations for the reader and writer sections of FIG. 2.
Figure 5B:
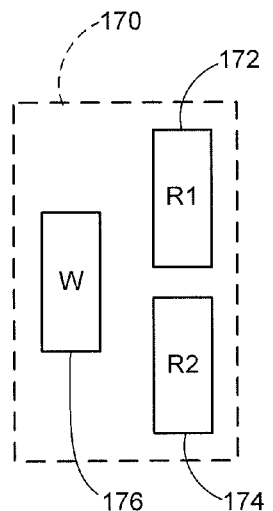
Figure 5C:
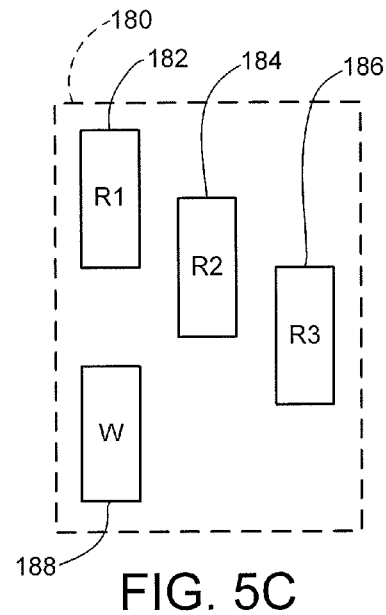

The writer and reader sections 144, 146 of the transducer 128 (FIG. 2) can take a variety of configurations, such as generally illustrated in FIGS. 5A-5C. Other arrangements can be used so these configurations are merely exemplary and are not limiting.

FIG. 5A shows an exemplary transducer 160 having a single read element (R) 162 and a single write element (W) 164. The read element 162 may take the form of a magnetoresistive (MR) read sensor. The write element 164 may take the form of a magnetic coil adapted to magnetically write data as a sequence of magnetic transitions to a recording layer of a magnetic medium (e.g., medium 140, FIG. 2). Perpendicular recording can be employed, in which case the write element 164 includes a main pole to direct magnetic flux to program a recording layer of the associated medium, and a return pole to receive magnetic flux from the medium to complete the magnetic circuit.

FIG. 5B shows another exemplary transducer 170 having dual read elements (R1 and R2) 172, 174 and a single write element (W) 176. The dual read elements are nominally centered in a cross-track direction with respect to the write element. The use of two (or more) reader elements allows the use of so-called two-dimensional magnetic recording (TDMR) or multi-sensor magnetic recording (MSMR) where the readers are concurrently used to transduce data from different tracks, or from the same track, during a read operation. While only a single write element (writer) 176 is shown, other embodiments contemplate the use of multiple writers.

FIG. 5C depicts another exemplary transducer 180 having three read elements (R1, R2 and R3) 182, 184, 186 and a single write element 188. The read elements are overlapping (staggered) in both the cross-track direction and the down-track direction. In some cases, only a subset of the readers are used during a read operation based on a number of factors such as skew angle of the transducer 180 with respect to the associated medium.

It can be seen from the example transducers 160, 170 and 180 of FIGS. 5A-5C that servo position information can be obtained as one (or more) of the readers transduces the servo data (servo fields 152, FIG. 4) of an associated medium. The actual position of the write element will tend to be offset from the sensing read element based on various factors including intra-transducer spacing, transducer skew, and microactuator position. As noted above, this can produce uncertainty during a write operation in that the actual position of the writer with respect to a given track may be outside of a safe write region, leading to the possibility that the write operation may inadvertently partially or fully overwrite existing data on the medium.

Figure 6:
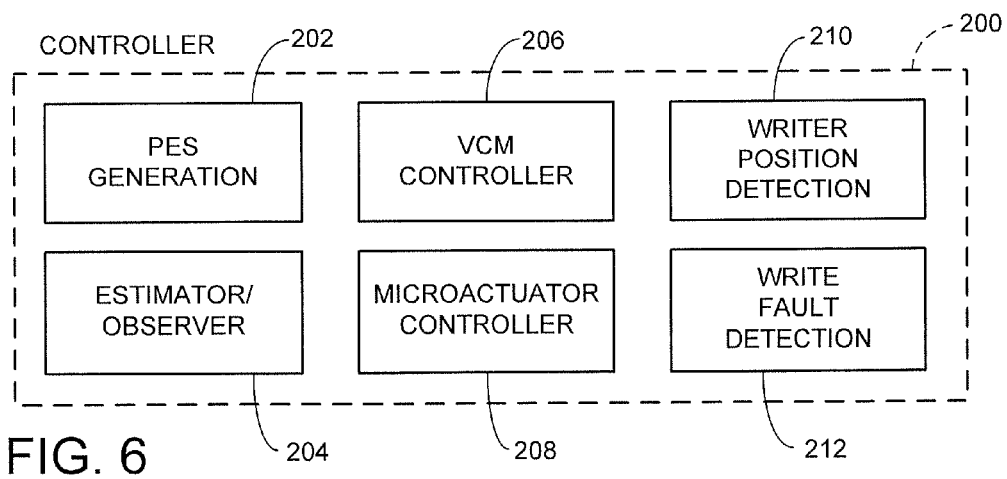
FIG. 6 is a functional block diagram of the controller block depicted in FIG. 2.

Accordingly, various embodiments of the present disclosure provide an enhanced controller architecture that provides accurate estimates of writer position during write operations. FIG. 6 shows a controller 200 in accordance with some embodiments. The controller 200 nominally corresponds to the controller discussed in FIGS. 1-2 and can be realized in hardware, software and/or firmware, as required. The controller 200 can be incorporated into a single device (e.g., a system on chip, SOC) or can be distributed across a number of components, including components mounted to the actuator.

The controller 200 includes a position error signal (PES) generation block 202, an estimator/observer (or simply "observer") block 204, a voice coil motor (VCM) controller block 206, a microactuator (uA) controller block 208, a writer position detection block 210 and a write fault detection block 212. Additional blocks may be incorporated into the controller design as required.

Figure 7:
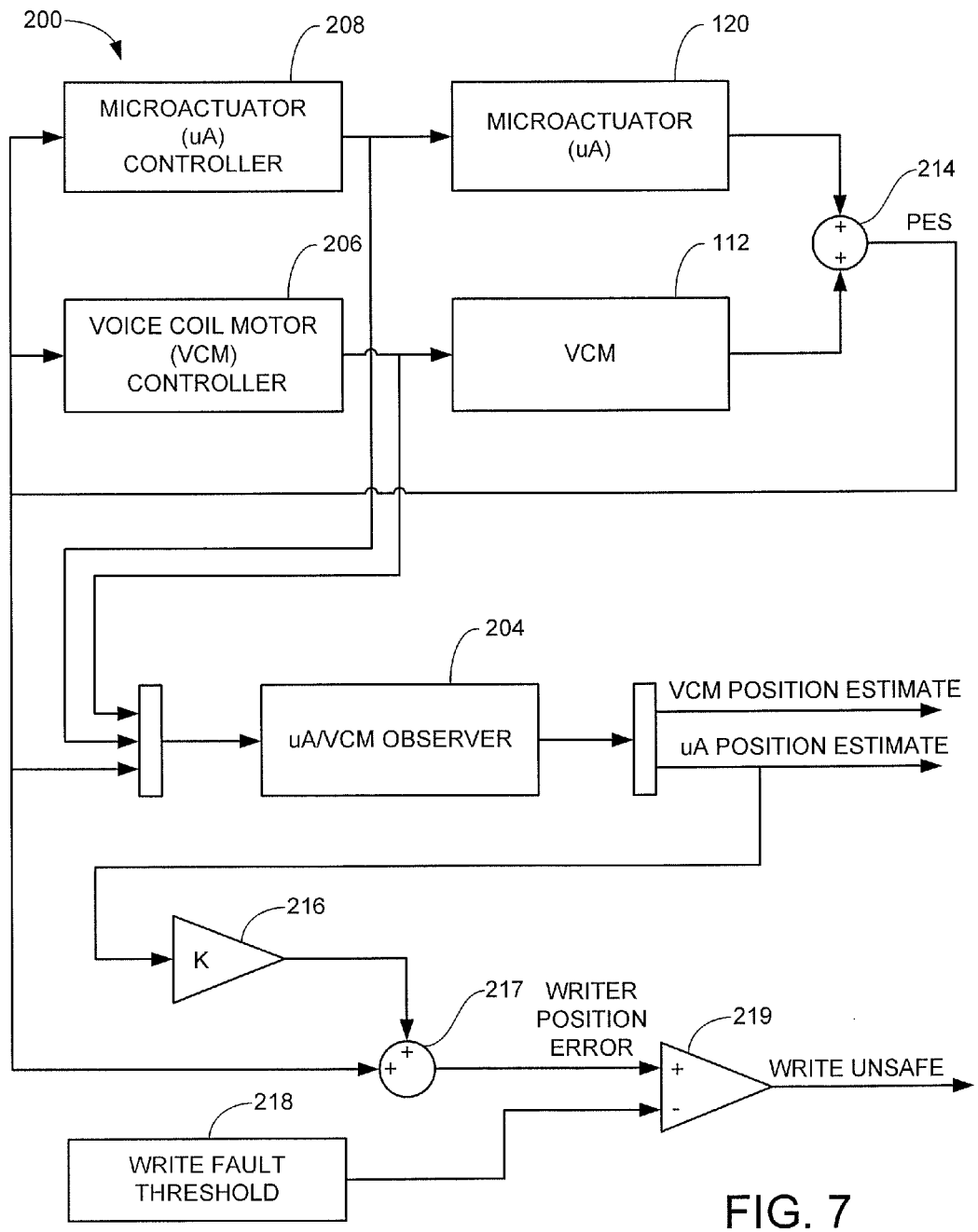
FIG. 7 is a diagrammatic representation of controller functions carried out by the controller of FIG. 6 in some embodiments.

The controller 200 generally operates as set forth in FIG. 7, although other arrangements can be used. Various functions carried out in FIG. 7 can be implemented in hardware, firmware and/or software. Based on a given input vector (not separately represented in FIG. 7), the voice coil motor (VCM) and microactuator (uA) controllers 206, 208 supply respective control inputs to the VCM 112 and uA 120. The outputted positions are combined at summing junction 214 to form a position error signal (PES).

The observer 204 receives the VCM and microactuator control inputs as well as the PES to generate separate position estimates for both the VCM and the microactuator. The microactuator position estimate is supplied to an amplifier 216 having gain K. The output of the amplifier 216 is summed with the PES at summing junction 217 to provide an indication of the actual writer position.

The actual writer position is compared to a write fault threshold value supplied by block 218 by a comparison circuit (e.g., comparator) 219. If the writer position is outside the threshold, a write unsafe trigger is generated which temporarily interrupts further writing operations by the write element.

A state space design is used for the observer, and second order models are provided for the VCM and microactuator in the controller architecture. The VCM and the microactuator can be modeled in state space in accordance with the following equations:

$$X(k+1)=Ax(k)+Bu(k)$$

$$y(k)=Cx(k)+Du(k) \quad (1)$$

where k are the servo samples from k=1 to m, y represents the position error signal (PES) at the associated reader for sample k, and X is the state vector for the next sample position (k+1). A, B, C and D are values describing the system. The value u generally represents the input vector to the system. For the VCM this could be in the form of a driving current applied to the voice coil. For the microactuator this could be the applied voltages applied to the PZT elements.

The estimator/observer can be modeled as follows:

$$\bar{X}(k+1)=A\bar{X}(k)+Bu(k)+L(y(k)-\bar{y}(k))$$

$$\bar{y}(k)=C\bar{X}(k)+Du(k) \quad (2)$$

where L is the estimator/observer gain vector. This vector shapes the estimator bandwidth. A variety of known techniques can be used to design the gain vector through appropriate pole placement.

The foregoing state equations can be used as described above to detect the position of the reader or readers used to detect the servo information. The additional read/write offset required to detect the position of the writer can be expressed as follows:

$$\Delta rw = \bar{X}u\left[\frac{\overline{RW}}{\overline{PR}}\right] \quad (3)$$

Where $\Delta rw$ is the additional read/write offset (distance from the reader to the writer in the non-neutral microactuator position) required in addition to the pre-calibrated reader/writer offset with the microactuator at the neutral position, $\bar{X}u$ is the estimated microactuator position, $\overline{RW}$ is the reader/writer offset on the microactuator, and $\overline{PR}$ is the distance from the microactuator pivot (P) on the actuator arm to the reader (R). The value $\overline{RW}/\overline{PR}$ generally corresponds to the gain K of amplifier 216 in FIG. 7.

Figure 8:
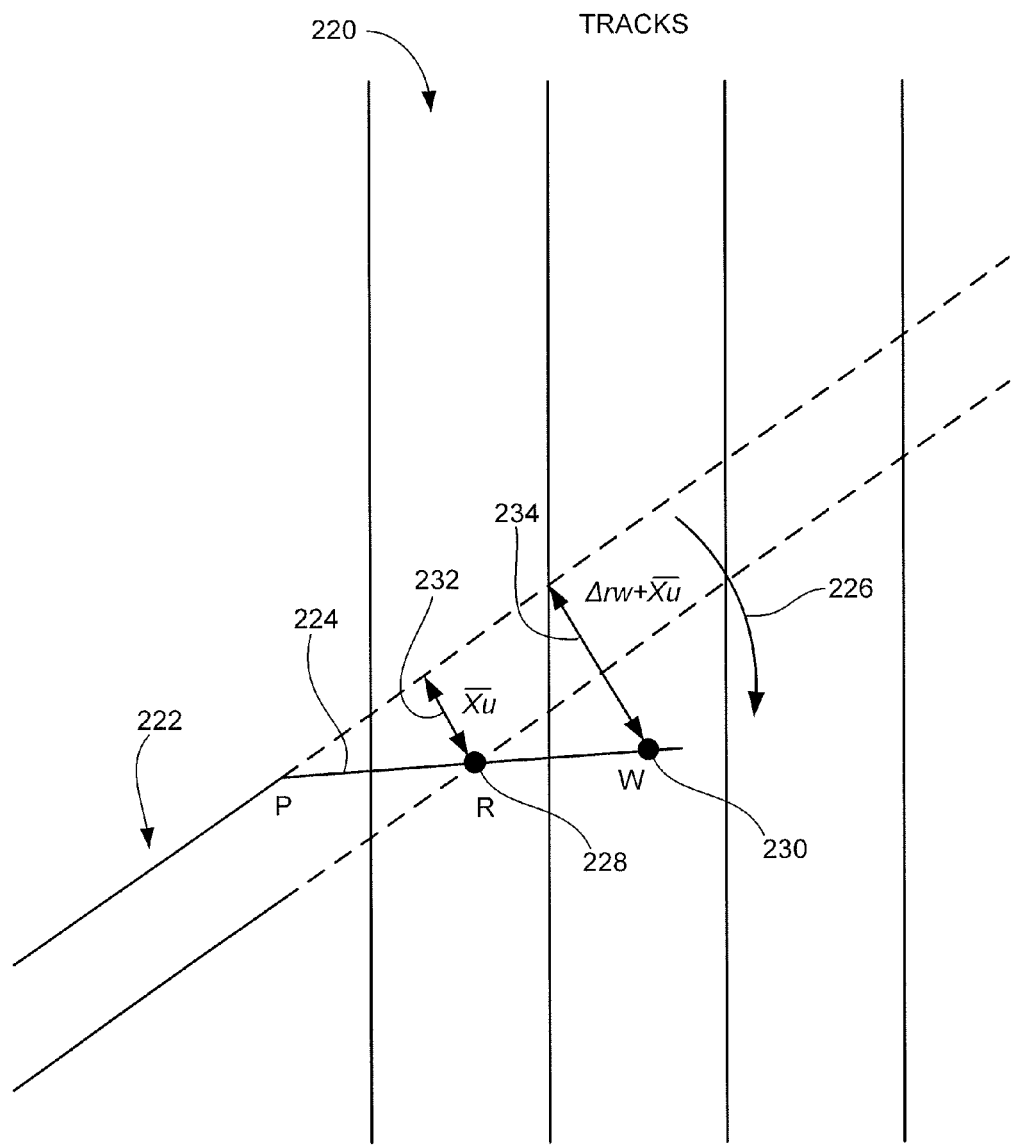
FIG. 8 is a schematic representation of microactuator (uA) offsets determined in accordance with various embodiments.

FIG. 8 diagrammatically represents the reader/writer offset determination. As shown in FIG. 8, a number of adjacent tracks are depicted at 220, and an actuator arm is generally denoted at 222. A microactuated transducer is represented by canted line 224, showing deflection away from the neutral position along arcuate path 226. A sensing reader (R) is represented by dot 228, and the writer (W) is represented by dot 230.

It follows that $\bar{X}u$ generally corresponds to the amount of deflection of the sensing reader R (represented by distance 232), and the entire deflection of the writer W can be expressed as $\Delta rw+\bar{X}u$ (distance 234). It will be noted that these are first order approximations; higher order estimates can be generated as desired.

Figure 9:
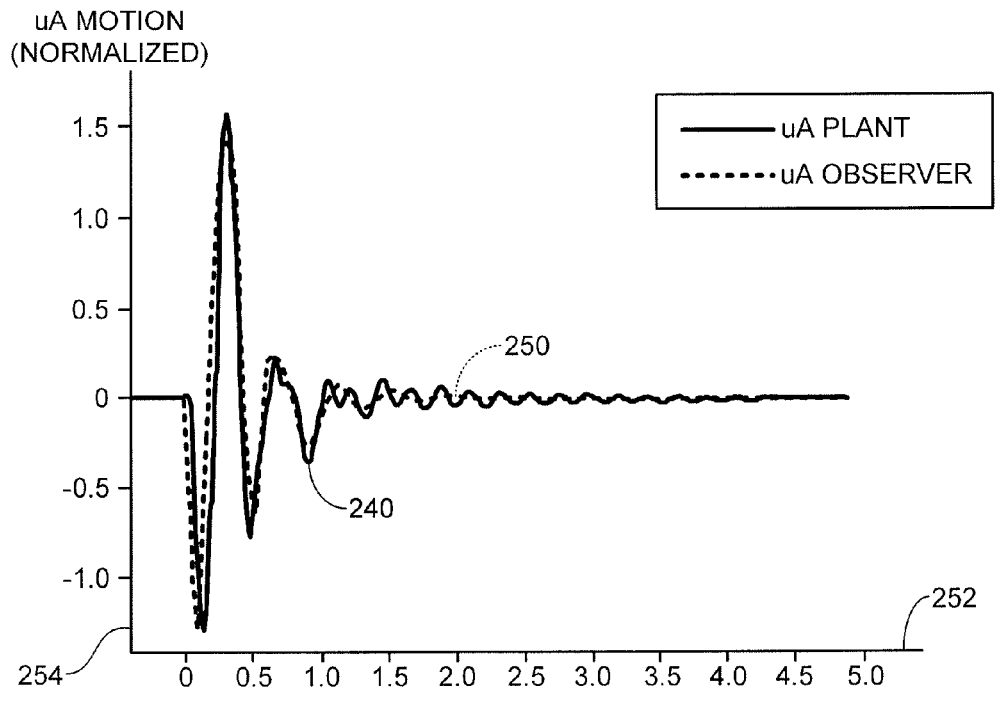
FIG. 9 is a graphical representation of actual versus estimated microactuator position using the system represented in FIG. 7.

Computer simulation results were found to confirm the operability of the system of FIG. 7. FIG. 9 provides a graphical representation of microactuator plant and microactuator observer curves 240, 250 plotted against an elapsed time x-axis 252 and a normalized microactuator motion y-axis 254. As can be seen from FIG. 9, the microactuator observer provides accurate modeling of microactuator motion.

Figure 10:
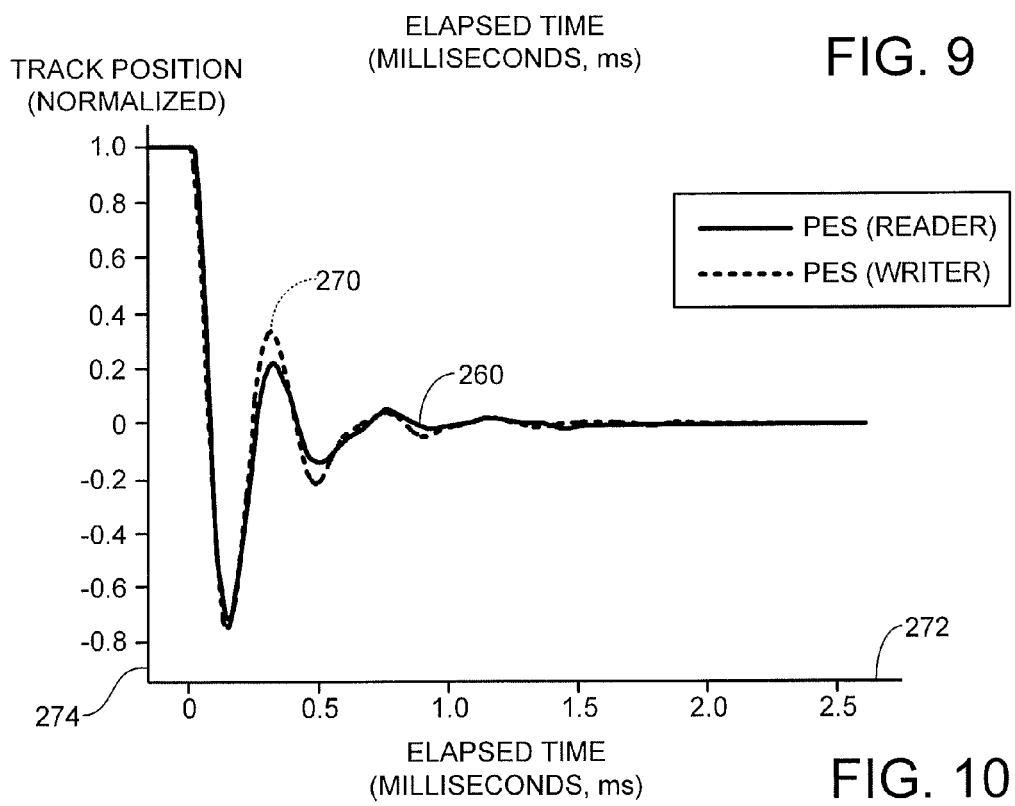
FIG. 10 is a graphical representation of position error signal (PES) for the respective reader and writer sections of FIG. 2 using the system of FIG. 7.

FIG. 10 provides a graphical representation of PES reader and PES writer curves 260, 270 plotted against an elapsed time x-axis 272 and a normalized track position y-axis 274. The curves demonstrate that the microactuator observer provides an accurate estimation of the PES at the writer as affected by microactuator motion. For reference, the design simulation assumed a reader/writer offset of nominally 5 µm ($5\times10^{-6}$ m) and a distance from the microactuator base (hinge) to the reader of nominally 50 µm. It will be noted that these were for demonstration purposes only and will not necessarily correspond to an implemented design.

Figure 11:
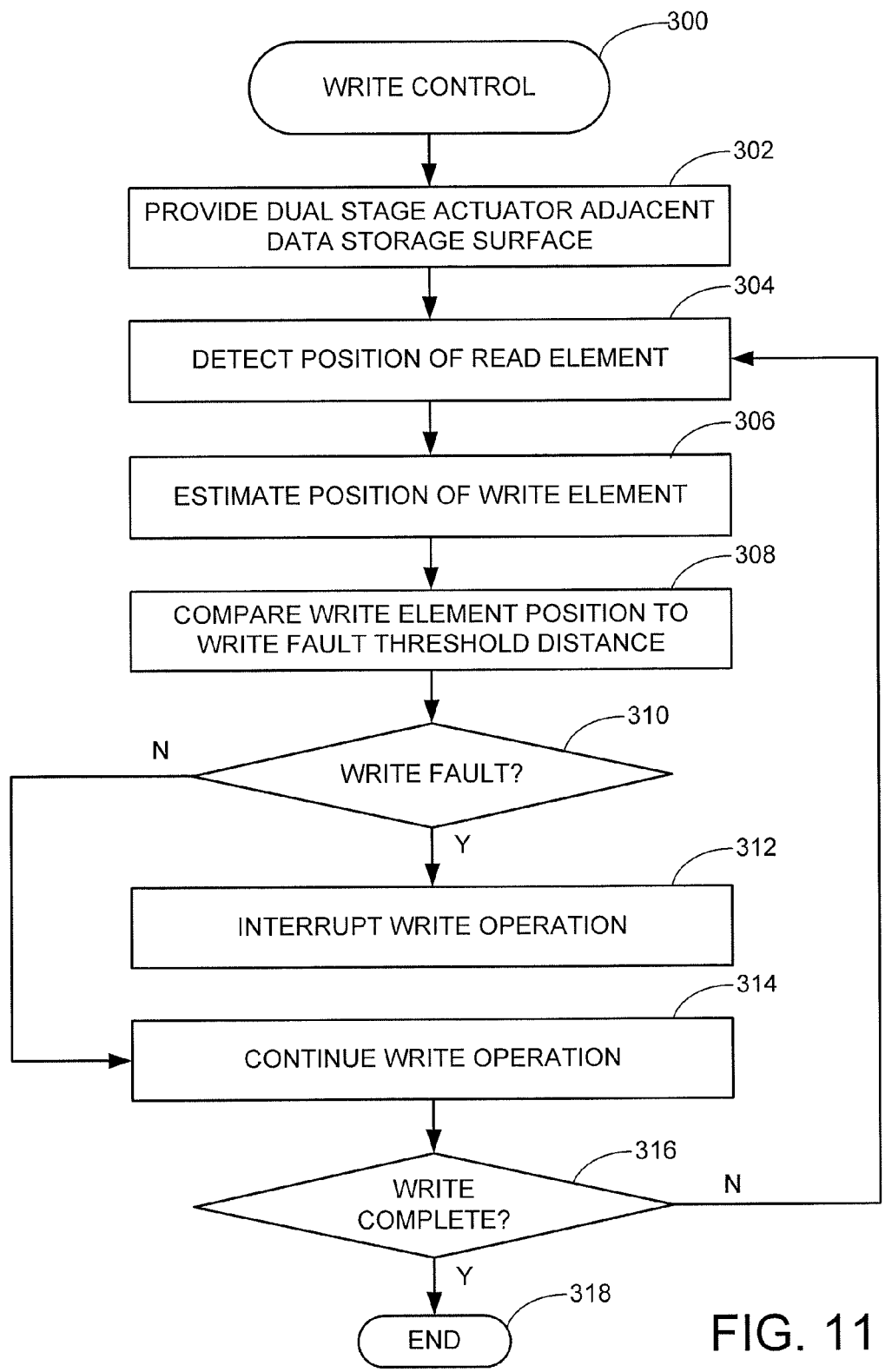
FIG. 11 is a flow chart for a write control routine carried out in accordance with various embodiments of the present disclosure.

FIG. 11 is a flow chart for a write control routine 300 generally illustrative of steps carried out in accordance with the foregoing discussion. The routine 300 will be described using the actuator 100 of FIG. 1 under control of the controller 200 of FIG. 7 to write data to an associated media surface using a write element, as generally depicted in FIGS. 2 and 8. It is contemplated, albeit not necessarily required, that the microactuator will be in a deflected position (see e.g., FIG. 3B) away from the neutral position (see e.g., FIG. 3A) during the write operation. The various steps shown in FIG. 11 can be modified, appended, omitted, and/or performed in a different order.

A dual stage actuator such as 100 is provided adjacent a data storage surface at step 302. A position of a read element of a transducer supported by the actuator relative to the storage surface is detected at step 304. This can be carried out as discussed above using the controller 200 of FIG. 7.

The position of a write element of the transducer relative to the read element is next estimated at step 306. This is carried out as discussed above in FIGS. 7-8. A write fault threshold distance is established and compared to the write element position at step 308.

If a write fault is declared, as indicated by decision step 310, an ongoing write operation is interrupted at step 312. The declaration of the write fault may include the setting of a status flag in a local memory location which signals to the controller to deassert a write gate or other signal level to impede the further writing of data to the media surface. Otherwise, the routine continues at step 314 to continue to write data to the storage surface using the write element.

The foregoing processing continues for each successive servo sample until the write operation is completed, as indicated by decision step 316, after which the process ends at step 318.

The system is responsive to various environmental effects including mechanical vibration which may be present during the write operation carried out during execution of the routine 300 of FIG. 11. Such vibration may be a result of an external stimulus (e.g., an adjacent data storage device, etc.) and may tend to change the position of the read element with respect to the data storage (recording) surface. It will be appreciated that the dual stage control scheme may induce a displacement of the microactuator away from the neutral position in response to such mechanical vibration and other environmental effects.

While the use of piezoelectric transducers (PZT) elements in a collocated microactuator has been provided as an illustrative example, such is merely for purposes of illustration and is not limiting. Other forms of microactuators can be used including magnetostriction elements, electrostatic elements, thermal elements, etc. Moreover, while certain embodiments have been described in the context of a data storage environment, such is merely exemplary and not necessarily limiting as the foregoing techniques have a variety of applications in a number of different types of control environments where a control object is positioned adjacent a reference point, and a particular writer component is offset with respect to a read position sensor.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a multi-stage actuator supporting a transducer adjacent a data recording surface, the actuator comprising a coarse actuator and a microactuator, the transducer comprising a write element and a read element separated from the write element; and
   a controller adapted to determine a position of the write element of the transducer with respect to the data recording surface responsive to a position of the read element of the transducer and a displacement distance of the microactuator away from a neutral position.

2. The apparatus of claim 1, the coarse actuator comprising a voice coil motor (VCM).

3. The apparatus of claim 2, the VCM adapted to advance the transducer along a first stroke path across the data recording surface and the microactuator is adapted to advance the transducer along a smaller, second stroke path across the data recording surface.

4. The apparatus of claim 1, the controller being further adapted to compare the position of the write element to a threshold, and to interrupt a write operation carried out by the write element responsive to the comparison of the position of the write element to the threshold.

5. The apparatus of claim 1, the controller comprising a first stage controller adapted to provide control inputs to a coarse position motor, a second stage controller adapted to provide control inputs to the microactuator, and an estimator/observer adapted to provide estimates of displacement components induced by the coarse position motor and the microactuator to the transducer.

6. The apparatus of claim 1, the microactuator characterized as a collocated microactuator comprising spaced apart first and second piezoelectric transducers (PZTs) connected between a rigid base plate and a cross-bar member which supports the transducer therebetween, the PZTs extending substantially parallel to a central axis that passes through a rotary pivot point about which the coarse actuator rotates and the transducer.

7. The apparatus of claim 1, the microactuator further adapted to establish a neutral position along a microactuator stroke path between opposing first and second distal extents, the microactuator displacing the transducer to a position adjacent a selected one of the first or second distal extents during a write operation in which the write element writes data to the data recording surface.

8. The apparatus of claim 1, further comprising said data recording surface, the data recording surface arranged with embedded servo data to define a plurality of tracks, the controller being further adapted to transduce the servo data using the read element to determine the position of the read element with respect to a selected track, and the controller determining the position of the write element relative to the position of the read element.

9. The apparatus of claim 1, the transducer comprising a plurality of individual read sensors, a plurality of the read sensors being used to determine the position of the write element.

10. The apparatus of claim 1, the controller being further adapted to generate a position error signal (PES) value to identify the position of the read element, and to generate the position of the write element as a modified PES value based on the PES value and the displacement of the microactuator.

11. An apparatus comprising:
    a data recording medium on which a plurality of adjacent tracks are defined;
    a multi-stage actuator supporting a transducer adjacent the data recording medium, the actuator comprising a voice coil motor (VCM) to advance the transducer along a first stroke path across the medium and a microactuator to advance the transducer along a second stroke path across the medium, the transducer comprising separate read and write elements; and
    a controller adapted to determine a position of the write element of the transducer with respect to a selected track on the medium during a write operation thereto responsive to a position of the read element and responsive to a displacement distance of the microactuator away from a neutral position along the second stroke path.

12. The apparatus of claim 11, the controller being further adapted to compare the position of the write element to a predetermined threshold, and to interrupt the write operation responsive to the position of the write element exceeding the predetermined threshold.

13. The apparatus of claim 11, the controller comprising a first stage controller adapted to provide control inputs to a coarse position motor, a second stage controller adapted to provide control inputs to the microactuator, and an estimator/observer adapted to provide estimates of displacement components induced by the coarse position motor and the microactuator to the transducer.

14. The apparatus of claim 11, the microactuator being characterized as a collocated microactuator comprising spaced apart first and second piezoelectric transducers (PZTs) connected between a rigid base plate and a cross-bar member which supports the transducer therebetween, the PZTs extending substantially parallel to a central axis of the actuator passing through a pivot point of the VCM and the transducer.

15. The apparatus of claim 11, the data recording medium comprising a surface arranged with embedded servo data to define the plurality of tracks, the controller being further adapted to transduce the servo data using the read element to determine the position of the read element.

16. The apparatus of claim 15, the controller being further adapted to use the transduced servo data to generate a position error signal (PES) value to identify the position of the read element, and to generate the position of the write element as a modified PES value based on the PES value and the displacement of the microactuator.

17. A method comprising:
    determining a position of a write element with respect to a recording surface in response to a position of a separate read element and a displacement of a microactuator away from a neutral position;
    initiating a write operation to write data to a selected data track on the recording surface using the write element; and
    interrupting a write operation in response to the determined position of the write element and a write fault threshold distance.

18. The method of claim 17, the microactuator being a collocated microactuator comprising spaced apart first and second piezoelectric transducers (PZTs) connected between a rigid base plate and a cross-bar member which supports the transducer therebetween, and wherein the method further comprises applying respective first and second voltages to the first and second PZTs to displace the microactuator away from the neutral position, the PZTs extending substantially parallel to a central axis that passes through the transducer and through a main pivot point of a course actuator supporting the transducer.

19. The method of claim 17, wherein the microactuator is displaced away from the neutral position in response to a mechanical vibration that changes the position of the read element with respect to the recording surface.

20. The method of claim 19, further comprising using the transduced servo data to generate a position error signal (PES) value to identify the position of the read element, and to generate the position of the write element as a modified PES value based on the PES value and the displacement of the microactuator.

* * * * *